US009645570B2

(12) United States Patent
Lin et al.

(10) Patent No.: US 9,645,570 B2
(45) Date of Patent: *May 9, 2017

(54) MONITORING SYSTEM

(71) Applicant: PEGATRON CORPORATION, Taipei (TW)

(72) Inventors: Yu-Te Lin, Taipei (TW); Chih-Yung Wang, Taipei (TW); Yu-Chen Liu, Taipei (TW); Yi-Lung Lin, Taipei (TW); Hung-Wen Chien, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,800

(22) Filed: Jan. 28, 2016

(65) Prior Publication Data
US 2016/0148473 A1    May 26, 2016

Related U.S. Application Data

(63) Continuation-in-part of application No. 14/191,445, filed on Feb. 27, 2014, now Pat. No. 9,285,791.

(30) Foreign Application Priority Data

Mar. 22, 2013  (TW) .............................. 102110333 A

(51) Int. Cl.
*G05B 21/02* (2006.01)
*G07C 3/02* (2006.01)
(Continued)

(52) U.S. Cl.
CPC ......... *G05B 19/4063* (2013.01); *G06K 15/00* (2013.01); *G07C 3/02* (2013.01);
(Continued)

(58) Field of Classification Search
CPC ............... G06Q 30/0617; G06Q 40/00; G09G 2320/0633; G09G 2330/021;
(Continued)

(56) References Cited

U.S. PATENT DOCUMENTS 2,407,845 A * 9/1946 Nemeyer ............. B25H 1/0092
116/200
3,707,043 A * 12/1972 Jones ................... B25H 1/0092
33/1 N
(Continued)

FOREIGN PATENT DOCUMENTS

CN            202486830 U       10/2012
TW            586668            5/2004
(Continued)

*Primary Examiner* — Fekadeselassie Girma
(74) *Attorney, Agent, or Firm* — CKC & Partners Co., Ltd.

(57) ABSTRACT

A monitoring system includes at least one light sensor, at least one fastener and at least one controller. The light sensor is configured to detect light emitted by an operation lamp. The fastener wraps around the operation lamp, and it includes a light-shielding body. The light-shielding body has an accommodation groove and an inner surface. The inner surface is adjacent to the operation lamp. The accommodation groove is concavely formed at the inner surface. The light sensor is accommodated in the accommodation groove. The controller is electrically connected with the light sensor for determining a status of the machine according to the light detected by the light sensor.

16 Claims, 16 Drawing Sheets

(51) Int. Cl.
*G05B 19/4063* (2006.01)
*G06K 15/00* (2006.01)
(52) U.S. Cl.
CPC .............. *G05B 2219/31455* (2013.01); *G05B 2219/33192* (2013.01); *G05B 2219/45044* (2013.01)
(58) Field of Classification Search
CPC .. G09G 2360/144; G09G 3/3406; G09G 5/10; H02S 50/10; H04H 60/04
See application file for complete search history.

(56) References Cited

U.S. PATENT DOCUMENTS

| | | | | | |
|---|---|---|---|---|---|
| 3,733,855 | A * | 5/1973 | Bliss-Hill | ............. | D04B 15/66 66/219 |
| 4,785,544 | A * | 11/1988 | Heinsius | ............. | B25H 1/0085 33/334 |
| 5,361,504 | A * | 11/1994 | Huang | ............. | B25H 1/0085 33/334 |
| 5,868,101 | A * | 2/1999 | Marshall | ............. | A01K 39/014 119/428 |
| 5,897,786 | A * | 4/1999 | Henkel | ............. | B01D 21/0003 210/360.1 |
| 5,917,587 | A * | 6/1999 | Rando | ............. | G01C 15/004 356/149 |
| 6,088,623 | A * | 7/2000 | Yowler | ............. | G01C 15/004 356/248 |
| 6,375,395 | B1 * | 4/2002 | Heintzeman | ............. | B25H 1/0092 408/13 |
| 6,813,843 | B1 * | 11/2004 | Faubion | ............. | B23Q 17/2233 33/520 |
| 6,878,954 | B2 * | 4/2005 | Butler | ............. | B23D 59/002 250/559.29 |
| 7,164,474 | B2 * | 1/2007 | Arntson | ............. | G01B 11/26 33/286 |
| 7,200,516 | B1 * | 4/2007 | Cowley | ............. | B23B 49/00 356/138 |
| 7,236,154 | B1 * | 6/2007 | Kerr | ............. | G06F 1/1616 345/102 |
| 7,992,311 | B2 * | 8/2011 | Cerwin | ............. | B23B 49/006 33/286 |
| 8,159,681 | B2 * | 4/2012 | Bock | ............. | G01B 21/16 356/614 |
| 8,834,073 | B2 * | 9/2014 | Duroe | ............. | B65G 43/08 271/195 |
| 9,114,494 | B1 * | 8/2015 | Mah | ............. | B23Q 17/2233 |
| 9,289,833 | B2 * | 3/2016 | Schmidt | ............. | B25F 5/021 |
| 9,449,805 | B2 * | 9/2016 | Perelman | ............. | H01J 49/068 |
| 2002/0027776 | A1 * | 3/2002 | Gross | ............. | B60Q 1/482 362/84 |
| 2002/0164217 | A1 * | 11/2002 | Peterson | ............. | B25H 1/0092 408/1 R |
| 2003/0106226 | A1 * | 6/2003 | Tacklind | ............. | G01C 15/002 33/286 |
| 2004/0187326 | A1 * | 9/2004 | Yung | ............. | G01C 15/004 33/286 |
| 2004/0222292 | A1 * | 11/2004 | Turocy | ............. | G06Q 20/1085 235/381 |
| 2005/0071124 | A1 * | 3/2005 | Komatsu | ............. | B23Q 17/00 702/182 |
| 2005/0072194 | A1 * | 4/2005 | Ryohke | ............. | D06F 19/00 68/3 R |
| 2008/0117396 | A1 * | 5/2008 | Hori | ............. | G03F 7/7035 355/53 |
| 2008/0120196 | A1 * | 5/2008 | Reed | ............. | G06F 17/30017 705/17 |
| 2008/0252599 | A1 * | 10/2008 | Ross | ............. | H04N 5/262 345/157 |
| 2009/0014525 | A1 * | 1/2009 | Gillet | ............. | G06K 7/10613 235/470 |
| 2011/0069479 | A1 * | 3/2011 | Hashimoto | ............. | H05B 41/325 362/183 |
| 2012/0162650 | A1 * | 6/2012 | Wynn | ............. | G01N 21/8507 356/432 |
| 2013/0218321 | A1 * | 8/2013 | Miyamoto | ............. | B23K 26/38 700/166 |
| 2013/0265772 | A1 * | 10/2013 | Lu | ............. | G02B 5/0215 362/308 |
| 2014/0285349 | A1 * | 9/2014 | Lin | ............. | G05B 19/00 340/679 |
| 2014/0339303 | A1 * | 11/2014 | Crews | ............. | G07F 19/209 235/379 |
| 2015/0100000 | A1 * | 4/2015 | Asaoka | ............. | A61B 1/00135 600/587 |

FOREIGN PATENT DOCUMENTS

TW      M380524      5/2010
TW      M428503      5/2012

\* cited by examiner

MONITORING SYSTEM

RELATED APPLICATIONS

The present application is a continuation-in-part application of U.S. application Ser. No. 14/191,445 filed on Feb. 27, 2014, which was based on, and claims priority from, Taiwan Patent Application Serial Number 102110333, filed Mar. 22, 2013, the disclosure of which is hereby incorporated by reference herein in its entirely.

BACKGROUND

Technical Field

The invention relates to a monitoring system and, in particular, to a monitor system for monitoring the operation status of a machine.

Description of Related Art

In modern factories, CNC (computer numerical control) machines have become indispensable tools for accomplishing various machining operations such as cutting or drilling.

A factory may have tens of, or even hundreds of, CNC machines. For monitoring the operation status of each CNC machine, for example, whether the CNC machine is under operation or not, each CNC machine may be installed with a monitoring program for generating data reflecting the operation status of the machine. The CNC machine may provide the above-mentioned data to the administrator of the factory by connecting to a server via an interface.

However, the monitoring programs installed in CNC machines of different venders are different. Therefore, if machines from different venders (such as 10 different venders) are within the same factory, the manufacturer must purchase different monitoring programs (such as 10 different programs), which no doubt increases costs.

SUMMARY

In view of the above, the present disclosure provides a monitoring system that can monitor the operation statuses of different machines by light sensing. Therefore, costs are reduced significantly since it is not necessary to purchase different monitoring programs for machines from different venders.

According to one embodiment of the invention, a monitoring system can be used to monitor at least one machine. The machine has an operation lamp. The operation lamp is for emitting light at least when the machine is under operation. The monitoring system includes at least one light sensor, at least one fastener and at least one controller. The light sensor is configured to detect light emitted by the operation lamp. The fastener wraps around the operation lamp, and it includes a light-shielding body. The light-shielding body has an accommodation groove and an inner surface. The inner surface is adjacent to the operation lamp. The accommodation groove is concavely formed at the inner surface. The light sensor is accommodated in the accommodation groove. The controller is electrically connected with the light sensor for determining a status of the machine according to the light detected by the light sensor.

Since the operation lamp of the machine emits light when the machine is under operation, the monitoring system can use the light sensor to sense the brightness of the operation lamp of the machine to obtain whether the machine is under operation or not. Since it is only necessary to sense the brightness of the operation lamp of the machine, there is no need to purchase monitoring programs of different venders. Therefore, costs are reduced significantly.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
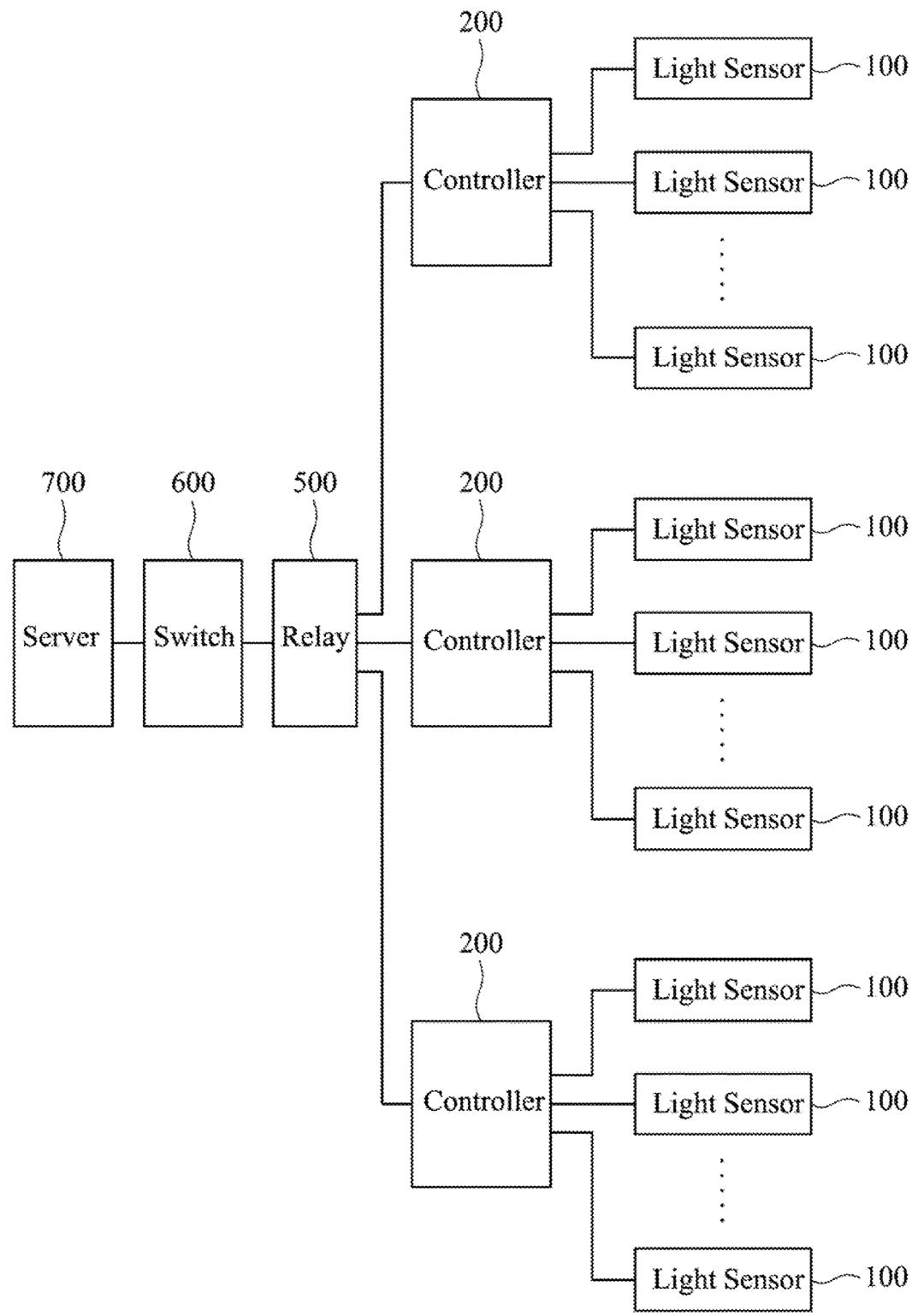
FIG. 1 is a system block diagram showing the monitoring system according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a system block diagram showing the monitoring system according to an embodiment of the invention. As shown in FIG. 1, the monitoring system according to the embodiment may include at least one light sensor 100, at least one controller 200, at least one relay (such as NPort®) 500, a switch 600 and a server 700. The light sensors 100 may be electrically connected to the same controller 200, and transmit the sensing signals generated respectively to the controller 200. The controllers 200 may be electrically connected to the relay 500. The relay 500 may be electrically connected to the server 700 via the switch 600. With this arrangement, an administrator can obtain the sensing signal of the light sensors 100 and the determination results of the controllers 200 via the server 700 to know the operation status of each machine.

Figure 2:
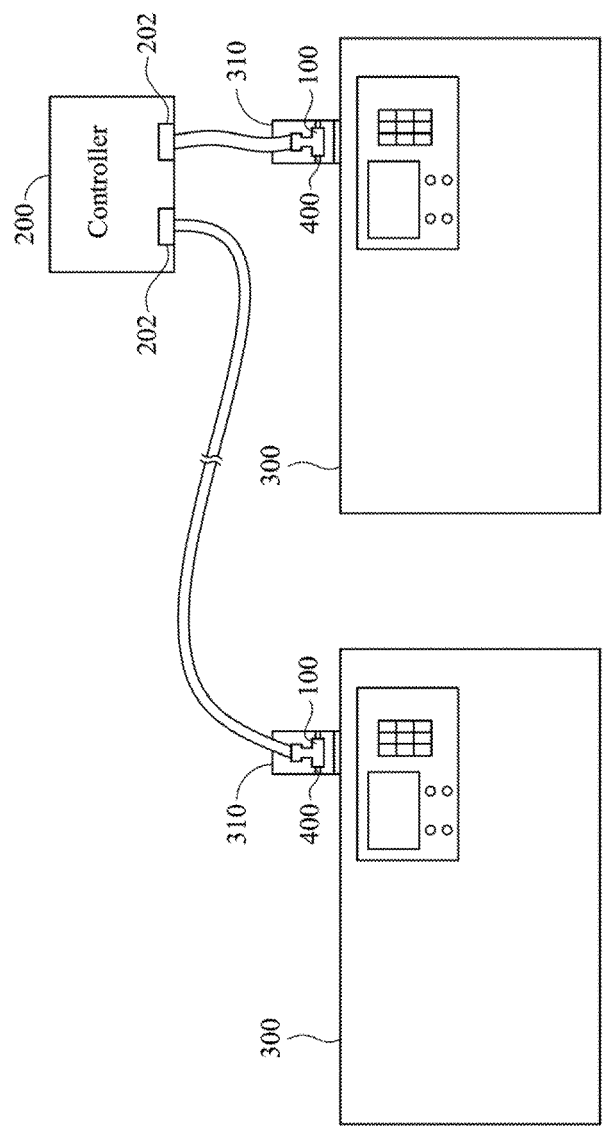
FIG. 2 is an architecture diagram of the monitoring system according to an embodiment of the invention.

FIG. 2 is an architecture diagram of the monitoring system according to an embodiment of the invention. As shown in FIG. 2, each machine 300 has an operation lamp 310. The operation lamp 310 is for emitting light when the machine 300 is under an operation status. Specifically speaking, when the operation status of the machine 300 is under operation, the operation lamp emits light, and when the operation status of the machine 300 is not under operation, the operation lamp 310 does not emit light. That is, the emission of light of the operation lamp 310 is synchronized with the operation of the machine 300. The light sensor 100 is disposed at the operation lamp 310. The light sensor 100 sends the sensing signal according to the brightness of the operation lamp 310 of the machine 300. That is, the light sensor 100 sends the sensing signal when the operation lamp 310 of the machine 300 emits light due to the operation of the machine 300. The controller 200 is electrically connected to the light sensor 100 for determining the operation status of the machine 300 based on the sensing signal sent form the light sensor 100.

The emission of light of the operation lamp 310 is synchronized with the operation of the machine 300 to avoid industrial safety issues. Based on such characteristic, the monitoring system may use the light sensor 100 to sense the brightness of the operation lamp 310 of the machine 300 to obtain whether the operation status of the machine 300 is under operation or not under operation. Since it is only necessary for the embodiment to sense the brightness of the operation lamp 310 of the machine 300, there is no need to purchase monitoring programs from the venders of the machines 300 respectively. Therefore, costs are reduced significantly.

In some embodiments, as shown in FIG. 2, the controller 200 may include a plurality of connecting ports 202. The light sensors 100 may be electrically connected to the connecting ports 202 of the controller 200 respectively, and send sensing signals to the controller 200 respectively, for the controller 200 to determine the operation status of each machine 300. In other works, in the embodiment of the invention, one controller 200 may monitor multiple machines 300 via multiple light sensors 100. Therefore, the problem that in a conventional monitoring system one controller can only monitor one machine 300 due to the compatibility of the monitoring program can be overcome. In some embodiment, the machines 300 may be CNC machines, but the invention is not limited therein.

In some embodiments, as shown in FIG. 2, the monitoring system may selectively include at least one fastener 400. The fastener 400 is disposed at the operation lamp 310, and the light sensor 100 is disposed at the fastener 400. As a result, since the light sensor 100 is fastened on the operation lamp 310 via the fastener 400, it will not be detached from the operation lamp 310. In some embodiments, the fastener 400 wraps around the operation lamp 310. In a greater detail, the fastener 400 may have a ring-shaped structure so that the fastener 400 can be disposed tightly around the operation lamp 310 tightly to help fasten the light sensor 100. In some embodiments, the operation lamp 310 has columnar body so that the fastener 400 can be disposed tightly thereon. For example, the shape of the operation lamp 310 may be a cylinder, an oval cylinder or a prism, and the structure of the fastener 400 may vary in view of the shape of the operation lamp 310, the invention is not limited therein.

Figure 3:
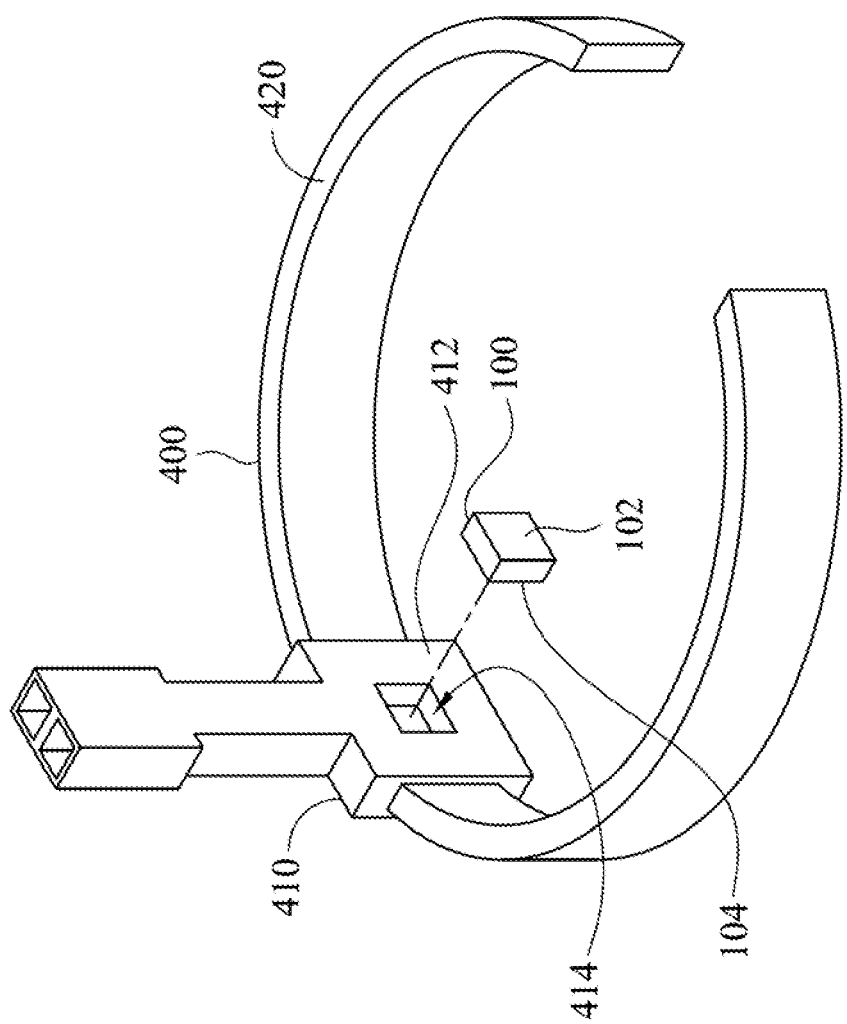
FIG. 3 is an exploded perspective diagram of the fastener and the light sensor according to one embodiment of the invention.

FIG. 3 is an exploded perspective diagram of the fastener 400 and the light sensor 100 according to one embodiment of the invention. As shown in FIG. 3, the fastener 400 includes a light-shielding body 410 and a ring-shaped portion 420. The ring-shaped portion 420 may be used to be disposed tightly around the operation lamp 310 (please refer in FIG. 2). The light-shielding body 410 is disposed at a portion of the ring-shaped portion 420. The light-shielding body 410 has an inner surface 412 and an accommodation groove 414. The inner surface 412 of the light-shielding body 410 is adjacent to the operation lamp 310 (please refer to FIG. 2). That is, when the fastener 400 is disposed around the operation lamp 310, the inner surface 412 of the fastener 400 is shielded and is not exposed to the outside. The accommodation groove 414 is concavely formed at the inner surface 412 of the light-shielding body 401. The light sensor 100 may be accommodated in the accommodation groove 414.

Since the inner surface 412 of the fastener 400 is not exposed to the outside when the fastener 400 is disposed around the operation lamp 310, the accommodation groove 414 and the light sensor 100 accommodated therein are not exposed to the outside, either. Therefore, the environmental light outside the light-shielding body 410 can be shielded by the light-shielding body 410, so that the light sensor 100 is capable of receiving the light emitted by the operation lamp 310 only (please refer to FIG. 2) and is not affected by the environmental light. In some embodiments, the shape and size of the light sensor 100 conform to those of the accommodation groove 414, so that the light sensor can be fitted in the accommodation groove 414.

In some embodiments, the light sensor 100 has a first surface 102 and a second surface 104 opposite to the first surface 102. When the fastener 400 is disposed around the operation lamp 310 (please refer to FIG. 2), the first surface 102 may be adjacent to the operation lamp 310 to receive the light from the operation lamp 310. The second surface 104 opposite to the first surface may be embedded into the accommodation groove 414 of the light-shielding body 410 so that it is not affected by the environmental light.

Figure 4:
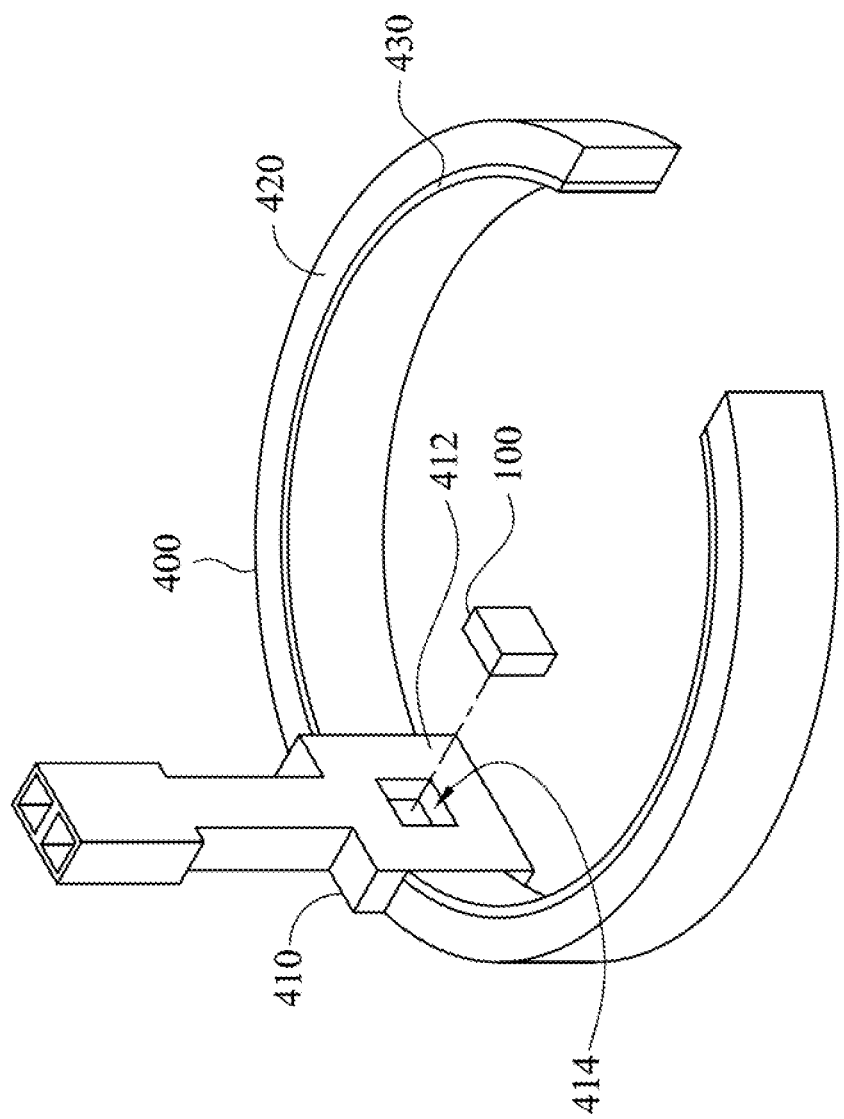
FIG. 4 is an exploded perspective diagram showing the fastener and the light sensor according to another embodiment of the invention.

FIG. 4 is an exploded perspective diagram showing the fastener 400 and the light sensor 100 according to another embodiment of the invention. The difference between the present embodiment and those shown in FIG. 3 is that the present embodiment further includes a flexible structure 430. The flexible structure 430 is disposed between the fastener 400 and the operation lamp 310 (please refer to FIG. 2). Specifically speaking, the flexible structure 430 is positioned at the inner side of the ring-shaped portion 420. When the ring-shaped portion 420 is disposed tightly around the operation lamp 310 (please refer to FIG. 2), the flexible structure 430 is sandwiched between the ring-shaped portion 420 and the operation lamp 310 to provide a buffer using its flexible characteristic and help the ring-shaped portion 420 to be disposed tightly around the operation lamp 310. In some embodiments, the shape and size of the flexible structure 430 are the same to those of the ring-shaped portion 420.

Figure 5:
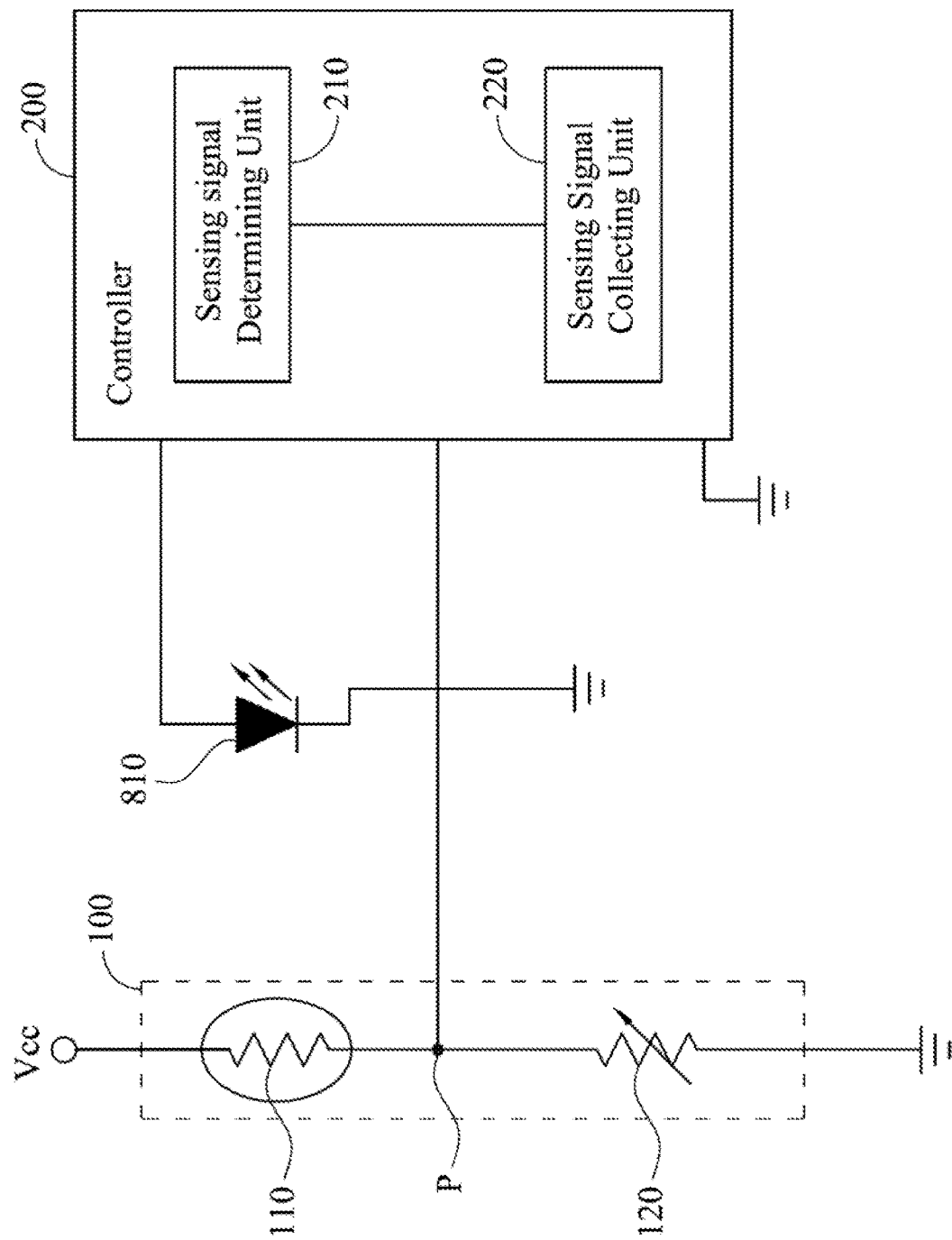
FIG. 5 is a circuit diagram between the light sensor and the controller according to an embodiment of the invention.

FIG. 5 is a circuit diagram between the light sensor 100 and the controller 200 according to an embodiment of the invention. As shown in FIG. 5, the controller 200 is electrically connected with the node P of the circuit of the light sensor 100. Therefore the voltage of the node P can be output to the controller 200 as the sensing signal. The light sensor 100 may include a photoresistor 110. The resistance of the photoresistor 110 may be changed according to the brightness of the operation lamp 310 of the machine 300. Specifically speaking, the resistance of the photoresistor 110 is related to the brightness of the received light. Therefore, the voltage of the node P changes along with the change of the brightness of the operation lamp 310, and the controller 200 can determine the operation status of the machine 300 according to the voltage of the node P received (please refer to FIG. 2). In other embodiments, the light sensor 100 may be other light-sensitive device other than the photoresistor 110, such as a photointerrupter. The inventor is not limited therein.

In some embodiments, as shown in FIG. 5, the controller may include a sensing signal determining unit 210. The sensing signal determining unit 210 may be used to determine whether the operation status of the machine 300 (please refer to FIG. 2) is under operation when the sensing signal (that is, the voltage of the node P) is of a high level. Specifically speaking, when the voltage of the node P conforms to the high level of the controller 200, the sensing signal determining unit 210 can determine that the machine 300 is under operation.

Practically, even when the machine 300 is under operation, the brightness of the operation lamp 310 may be reduced due to long-time operation, which results in that the voltage of the node P does not reach the high level of the controller 200 and thus the controller 200 cannot determine whether the machine 300 is under operation correctly. In view of this, in some embodiments, as shown in FIG. 5, the light sensor 100 may selectively include a variable resistor 120. The variable resistor 120 may be serially connected at the photoresistor 110. As a result, the user may change the ratio of the resistance between the variable resistor 120 and the photoresistor 110 by adjusting the resistance of the variable resistor 120 to adjust the voltage of the node P to facilitate the determination of the controller 200. For example, the user can increase the resistance of the variable resistor 120 to raise the voltage of the node P. In this way even when the brightness of the operation lamp 310 is reduced, the voltage of the node P may still reach the high level of the controller 200 to assist the controller 200 to determine the operation status of the machine 300 correctly.

In some embodiments, as shown in FIG. 5, the monitoring system may selectively include at least one light-emitting diode 810. The light-emitting diode 810 is electrically connected with the controller. The light-emitting diode 810 is used to emit light when the controller determines that the operation status of the machine 300 is under operation. That is, the light-emitting diode 810 emits light as long as the controller 200 determines that the operation status of the machine 300 is under operation. To the contrary, the light-emitting diode 810 does not emit light as long as the controller 200 determines that the operation status of the machine 300 is not under operation. Therefore, when the user observes that the operation lamp 310 emits light but the light-emitting diode does not emit light, the user can understand that the brightness of the operation lamp 310 may be insufficient, which causes the voltage of the node P to be insufficient to reach the high level of the controller 200 and thus the false determination of the controller 200. Afterward, the user can adjust the resistance of the variable resistor 120 so that the light emitting diode 810 and the operation lamp 310 emit light simultaneously to ensure that the determination of the controller 200 is correct.

In some embodiments, as shown in FIG. 5, the controller 200 may further include a sensing signal collecting unit 220. The sensing signal collecting unit 220 is electrically connected with the sensing signal determining unit 210. The sensing signal collecting unit 220 may collect multiple sensing signals sent from the light sensor 100 at multiple time points within a period of time. As long as one sensing signal is of a high level, it informs the sensing signal determining unit 210 to determine that the operation status of the machine 300 is under operation.

For example, if the sensing signal sent from the light sensor 100 at 7:00 is of a high level, the sensing signal sent at 7:01 is of a low level, the sensing signal sent at 7:02 is of a low level, and the sensing signal sent at 7:03 is of a high level, since at least one of the sensing signal between 7:00 and 7:03 is of a high level, the sensing signal determining unit 210 can determine that the operation status of the machine 300 (please refer to FIG. 2) between 7:00 and 7:03 is under operation.

As a result, the monitoring system mentioned above can be used effectively with a machine 300 having a blinking operation lamp 310. Specifically, in some embodiments, when the machine 300 is under operation, the operation lamp 310 does not emit light constantly but is blinking. Although the light sensor 100 cannot provide sensing signals of a high level at certain time points, since the sensing signal collecting unit 220 can collect the sensing signals sent from the light sensor 100 at multiple time points, it can inform the sensing signal determining unit 210 to determine that the operation status of the machine 300 is under operation as long as at least one sensing signal is of a high level. In this way, possible false determinations caused by the blinking lamp can be avoided.

Figure 6:
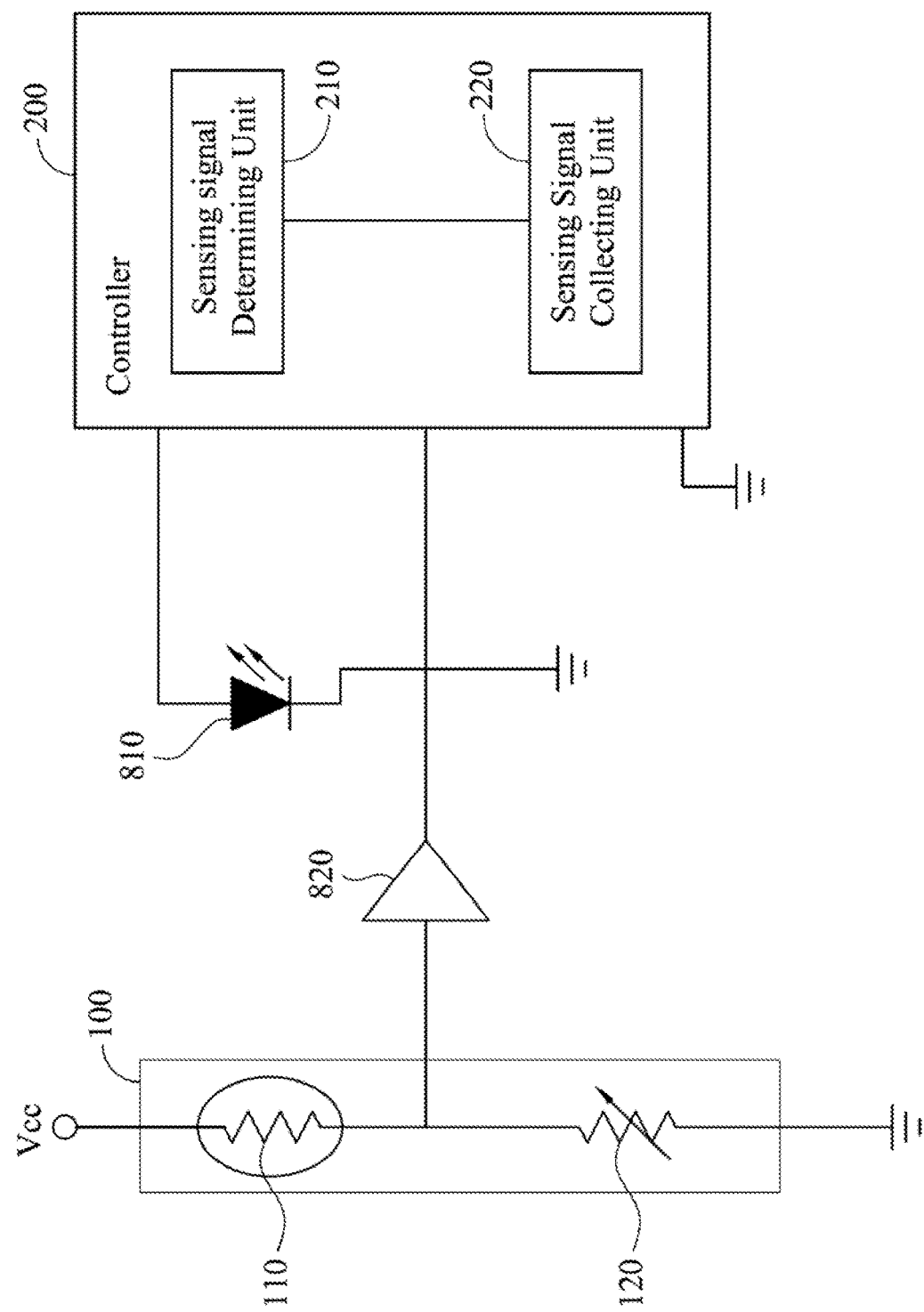
FIG. 6 is a circuit diagram between the light sensor and the controller according to still another embodiment of the invention.

FIG. 6 is a circuit diagram between the light sensor 100 and the controller 200 according to still another embodiment of the invention. The main difference between the present embodiment and that shown in FIG. 5 is that the present embodiment may selectively include an amplifier 820. The amplifier 820 is electrically connected between the light sensor 100 and the controller 200. The amplifier 820 is used to amplify the sensing signal sent from the light sensor 100 to the controller 200. In this way, the amplifier 820 can prevent the signal attenuation issue caused by the long distance between the light sensor 100 and the controller 200. In other words, the amplifier 820 is helpful for extending the distance between the light sensor 100 and the controller 200.

Figure 7:
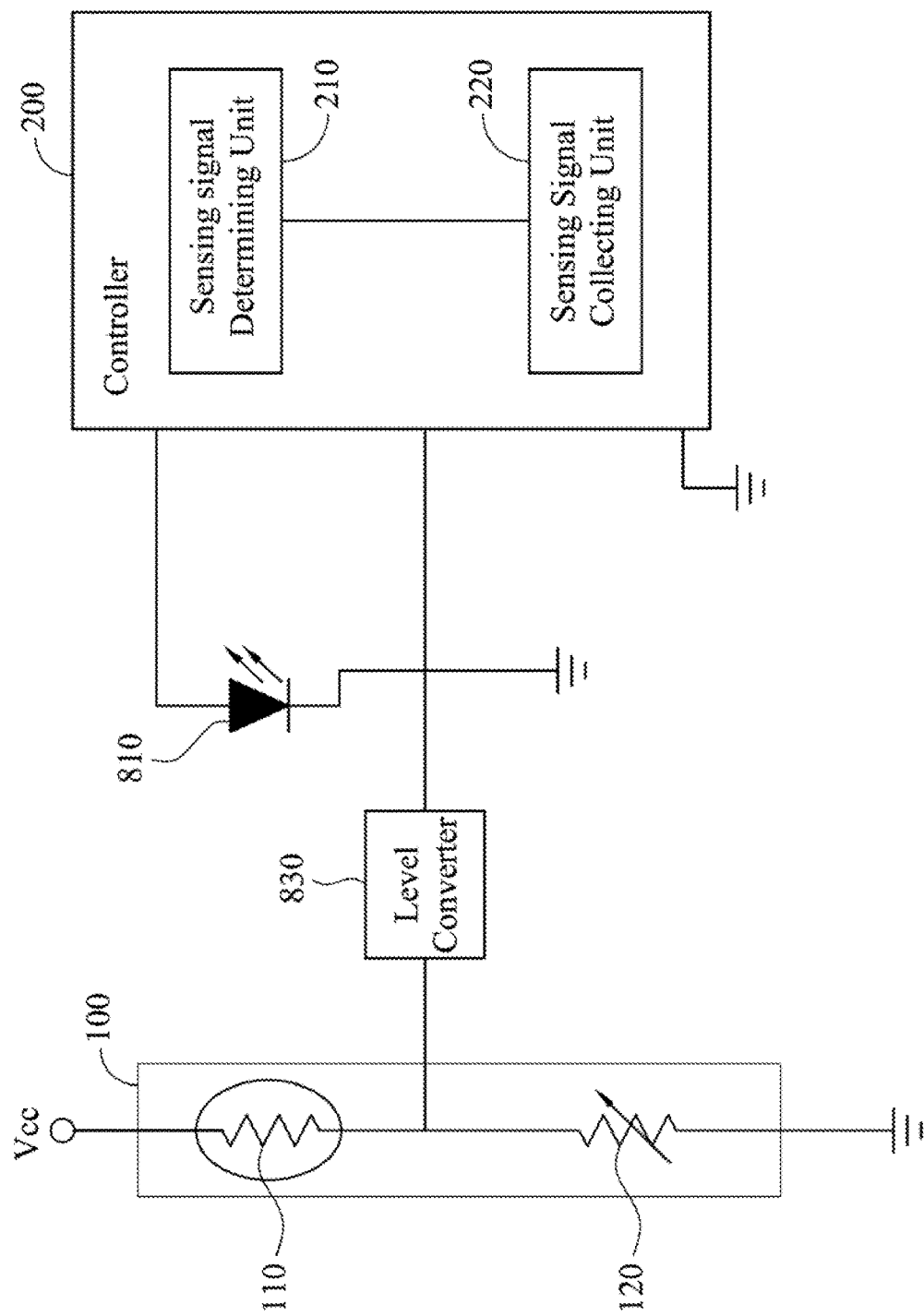
FIG. 7 is a circuit diagram between the light sensor and the controller according to still another embodiment of the invention.

FIG. 7 is a circuit diagram between the light sensor 100 and the controller 200 according to still another embodiment of the invention. The main difference between the present embodiment and that shown in FIG. 5 is that the present embodiment may further include a level converter 830. The level converter 830 is electrically connected between the light sensor 100 and the controller 200. The level converter 830 is used to increase the difference between the high level and the low level of the controller 200. Since the level converter 830 can increase the difference between the high level and the low level of the controller 200, the controller 200 is less sensitive regarding the determination of the sensing signal. Therefore, even when the signals are attenuated between the light sensor 100 and the controller 200 due to long distance, the controller does not make false determination. Therefore, the level converter 830 is helpful for extending the distance between the light sensor 100 and the controller 200.

Figure 8:
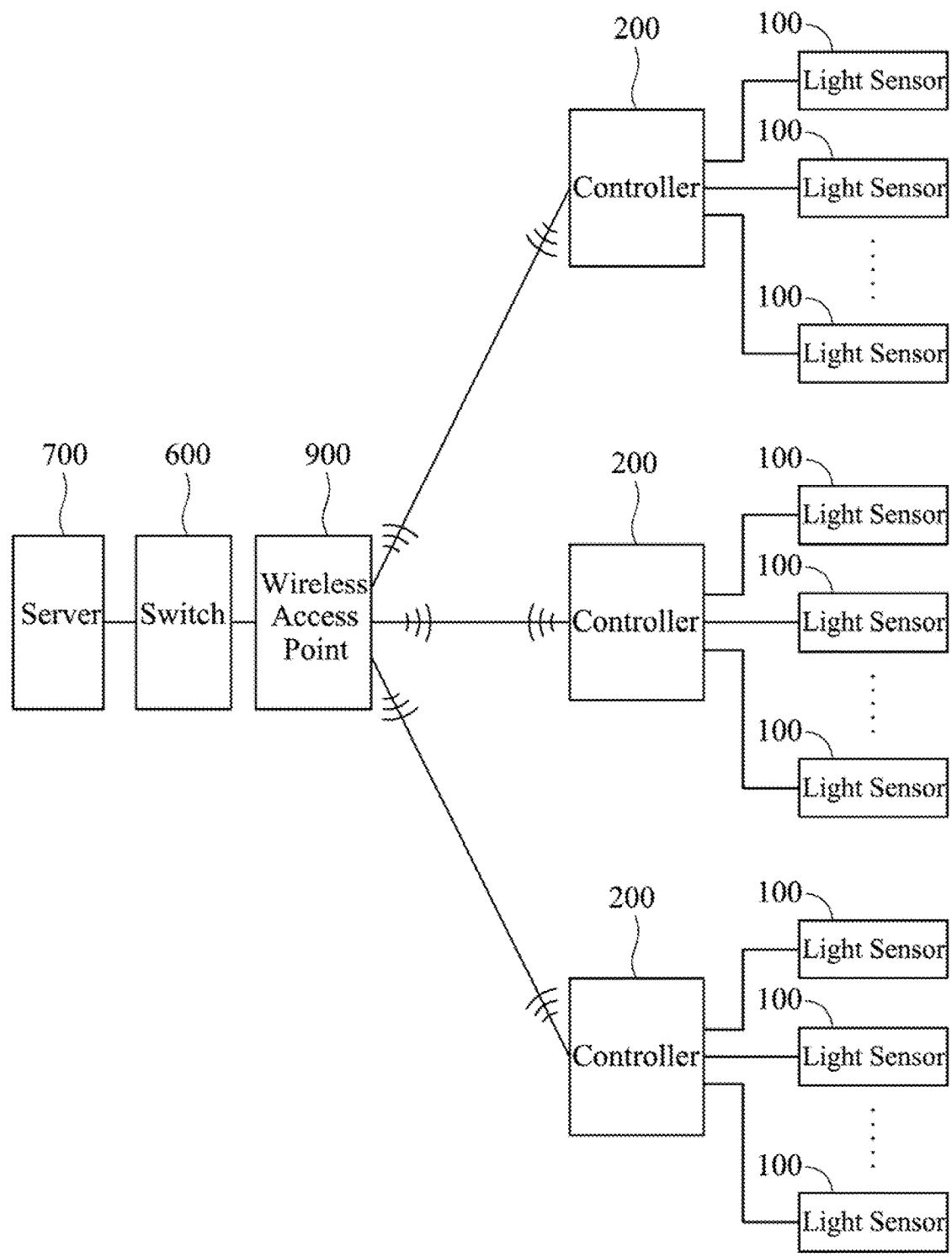
FIG. 8 is a system block diagram of the monitoring system according to another embodiment of the invention.

FIG. 8 is a system block diagram of the monitoring system according to another embodiment of the invention. The main difference between the present embodiment and that shown in FIG. 1 is that in the present embodiment a wireless access point 900 is used to replace the relay 500 in FIG. 1. Specifically speaking, the controller 200 can wirelessly connect to the wireless access point 900. The wireless access point 900 can electrically connect to the server 700 via the switch 600. The transmission specification of the wireless access point 900 may be Wi-Fi, Zigbee, or other RF signal transmission specification. The invention is not limited therein.

The monitoring system according to the above embodiments use the light sensor 100 to sense the brightness of the operation lamp 310 of the machine 300 to obtain whether the operation status of the machine 300 is under operation or not under operation. Since it is only necessary to sense the brightness of the operation lamp 310 of the machine 300, it is not necessary to purchase monitoring programs of different venders of different machines 300. Therefore, costs are reduced significantly.

Figure 9:
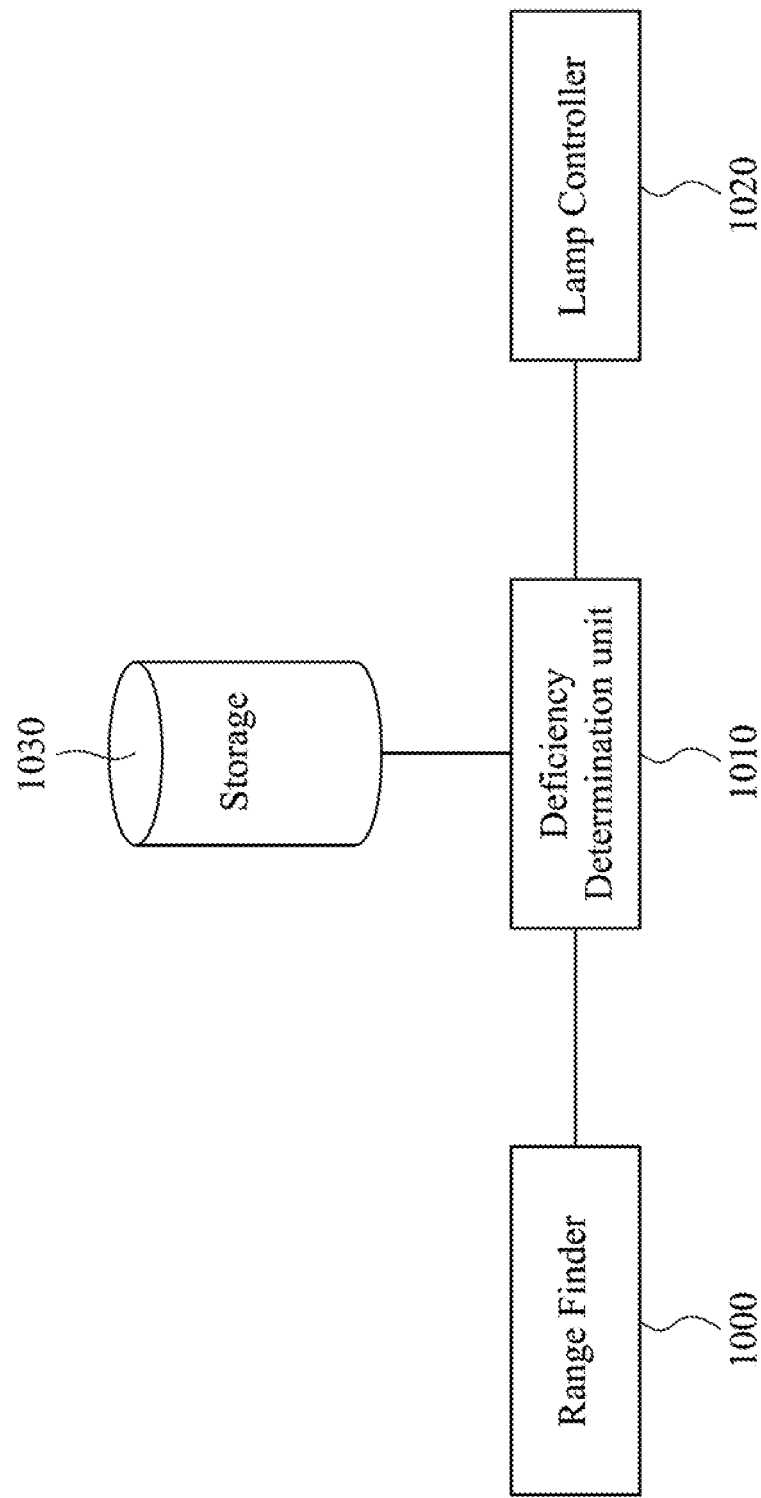
FIG. 9 is a block diagram of a system of detecting the tools of the machine.

In some embodiments, a deficiency of a tool of the machine 300 can be detected by the monitoring system. Reference can be made to FIG. 9, which is a block diagram of a system of detecting the tools of the machine 300. In FIG. 9, the system includes a range finder 1000, a deficiency determination unit 1010, a lamp controller 1020 and a storage 1030. The range finder 1000 can be configured to detect the deficiency of the tool of the machine in a manner of distance measurement. In particular, the range finder 1000 is capable of measuring the distance between the tool and the range finder 1000 by a light beam. Since the deficiency of the tool can be detected by distance measurement, rather than by image capturing, vibration detecting or temperature detecting, some disadvantages caused by image capturing, vibration detecting or temperature detecting can be prevented.

The range finder 1000 can be a laser range finder that emits a laser beam toward the tool of the machine and receives the reflected laser beam from the tool. The range finder 1000 can generate a signal based on the difference between the emitted laser beam and the reflected laser beam. The deficiency determination unit 1010 is electrically connected to the range finder 1000 to determine the deficiency of the tool based on the signal from the range finder 1000. The signal generated by the range finder 1000 can be transmitted to the deficiency determination unit 1010. The signal corresponds to the measured distance data. The storage 1030 stores a predetermined distance data corresponding to the distance between a tool without deficiency and the range finder 1010. The storage 1030 is electrically connected to the deficiency determination unit 1010, so that the deficiency determination unit 1010 can obtain the predetermined distance data from the storage 1030, can compare the measured distance data with the predetermined distance data, and can determine the deficiency of the tool based on the difference between the measured distance data and the predetermined distance data.

The lamp controller 1020 is electrically connected to the deficiency determination unit 1010 and the operation lamp 310, so that the lamp controller 1020 can change an optical property of the light emitted by the operation lamp 310 based on the determined deficiency of the tool. For example, the lamp controller 1020 can change the wavelength, the brightness or the polarization state of the light emitted by the operation lamp 310. The light sensor 100 can detect variation of the light emitted by the operation lamp 310 and can transmit the sensing signal corresponding to the variation to the controller 200. Therefore, the administrator can be informed about the deficiency of the tool of the machine 300 in time. The lamp controller 1020 and the controller 200 in the foregoing embodiments may be two individual controllers or may be integrated in a single controller.

Figure 10:
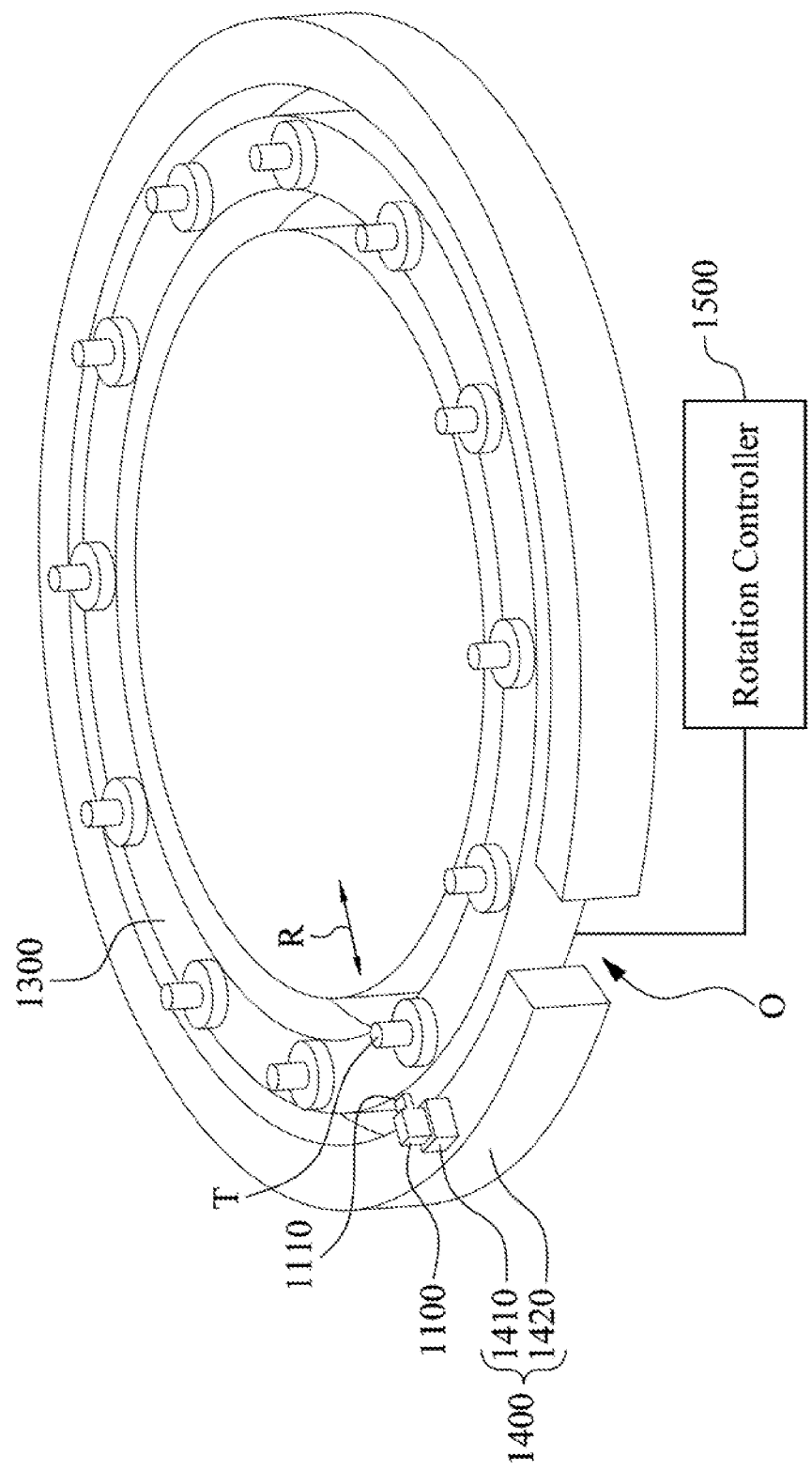
FIG. 10 to FIG. 16 are perspective views of systems of detecting a deficiency of a tool T in accordance with some embodiments of the present invention.

FIG. 10 is a perspective view of a system of detecting a deficiency of a tool T in accordance with some embodiments of the present invention. As shown in FIG. 10, the system includes a range finder 1100 and a tool holder 1300. The tool holder 1300 holds a plurality of tools T thereon. One of the tool holder 1300 and the range finder 1100 is movable with respect to another of the tool holder 1300 an the range finder 1100, so that the range finder 1100 can detect the tools T respectively and sequentially. When one of the tools T has a deficiency that is detected by the range finder 1100, the lamp controller 1020 (See FIG. 9) can change the optical property of the light emitted by the operation lamp (See FIG. 2).

In some embodiments, the system further includes a stator 1400 and a rotation controller 1500. The stator 1400 surrounds the tool holder 1300. The tool holder 1300 is electrically connected to the rotation controller 1500 and can rotate under control of the rotation controller 1500, so that the tool holder 1300 is rotatable with respect to the stator 1400. The range finder 1100 is stationary on the stator 1400. In such a configuration, the tool holder 1300 is rotatable with respect to the range finder 1100, and therefore, the range finder 1100 can detect the tools T respectively and sequentially when the tool holder 1300 rotates. In a greater detail, when the tool holder 1300 rotates such that one of the tools T is moved to block the laser beam emitted by the range finder 1100, the range finder 1100 can output an analog signal based on the distance between the range finder 1100 and the tool T, and the deficiency determination unit 1010 (See FIG. 9) can determine the deficiency based on the analog signal. For example, the analog signal may be analog voltage correlating to the distance between the range finder 1100 and the tool T, and the deficiency determination unit 1010 may determine the deficiency of the tool T based on the difference between the analog voltage generated by the range finder 1100 and the predetermined analog voltage stored in the storage 1030 (See FIG. 9).

In some embodiments, the stator 1400 includes a fixture 1410 and an annular structure 1420. The fixture 1410 is fixed on an annular surface of the annular structure 1420. The range finder 1100 is fixed on the fixture 1410. As such, the range finder 1100 can be stationary with respect to the stator 1400. In other words, both the range finder 1100 and the stator 1400 are static relative to the tool holder 1300. The range finder 1100 has a laser source 1110. The laser source 1110 emits a laser beam along a relatively constant direction because the range finder 1100 is static relative to the tool holder 1300. More particularly, the annular structure 1420 of the stator 1400 has a radial direction R. The laser source 1110 of the range finder 1100 emits the laser beam substantially along the radial direction R, and the tool holder 1300 is rotatable about a central axis of the annular structure 1420 of the stator 1400. As such, when the tool holder 1300 rotates, all of the tools T can be sequentially moved to a position on a traveling path of the laser beam, so that all of the tools T can be detected. In some embodiments, the annular structure 1420 of the stator 1400 has an opening O. The opening O may benefit replacement of the deficient tool T. For example, the deficient tool T can be removed from the tool holder 1300 and the machine 300 (See FIG. 2) through the opening O when the tool holder 1300 rotates. The deficient tool T is moved to the position exposed by the opening O, and then, another tool T can be put into the machine 300 and on the tool holder 1300 through the opening O. Thus, the replacement of the deficient tool T can be achieved.

Figure 11:
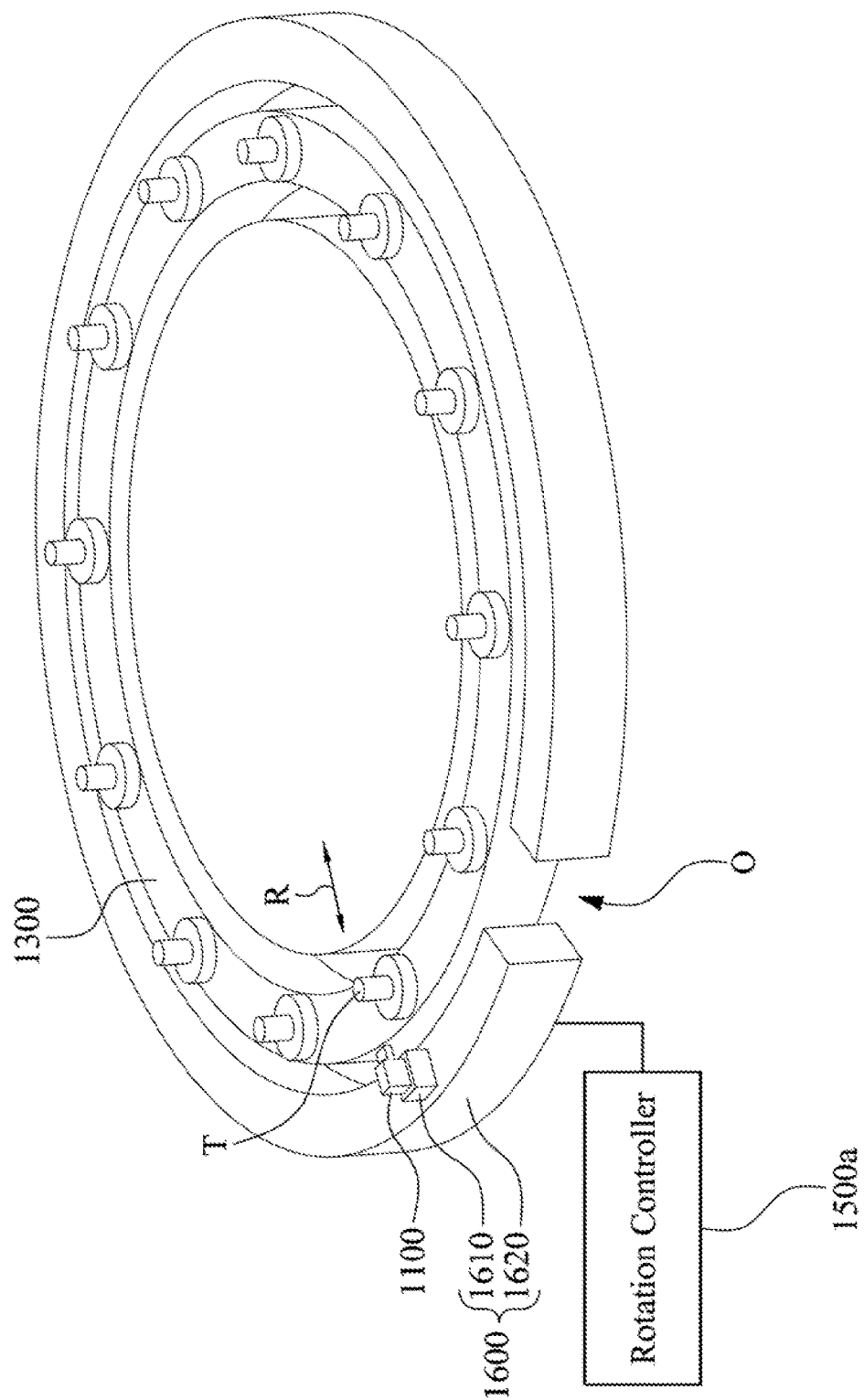

FIG. 11 is a perspective view of a system of detecting a deficiency of a tool T in accordance with some embodiments of the present invention. The main difference between this embodiment and which is shown in FIG. 10 is that: the system includes a rotor 1600 surrounding the tool holder 1300. The range finder 1100 is disposed on the rotor 1600. The rotor 1600 is electrically connected to the rotation controller 1500a and can rotate under control of the rotation controller 1500a, so that the rotor 1600 is rotatable with respect to the tool holder 1300. In such a configuration, the range finder 1100 is rotatable with respect to the tool holder 1300, and therefore, the range finder 1100 can detect the tools T held on the tool holder 1300 sequentially when the rotor 1600 rotates. In a greater detail, when the rotor 1600 rotates such that the range finder 1100 is moved circumferentially, the range finder 1100 can emit the laser beam to different tools T sequentially. In other words, the rotor 1600 is rotated such that a traveling path of the laser beam emitted from the range finder 1100 is moved to different tools T sequentially. When the laser beam is blocked by one of the tools T, the range finder 1100 can output an analog signal based on the distance between the range finder 1100 and the tool T.

In some embodiments, the rotor 1600 includes a fixture 1610 and an annular structure 1620. The fixture 1610 is fixed on an annular surface of the annular structure 1620. The range finder 1100 is fixed on the fixture 1610. As such, the range finder 1100 can be stationary with respect to the rotor 1600. In other words, both the range finder 1100 and the rotor 1600 are rotatable with respect to the tool holder 1300, so that the tools T can be sequentially detected by the range finder 1100 when the rotor 1600 rotates.

Figure 12:
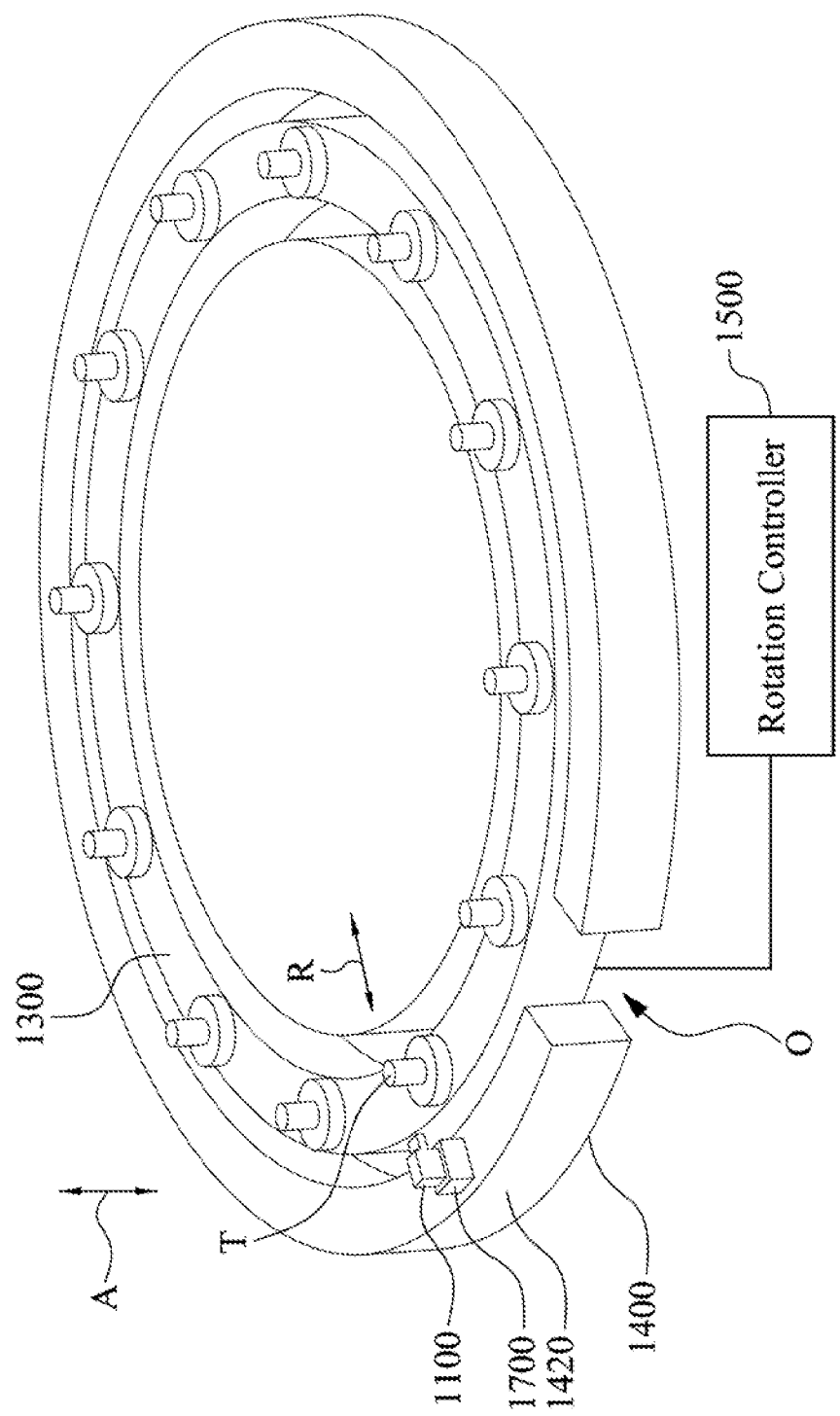

FIG. 12 is a perspective view of a system of detecting a deficiency of a tool T in accordance with some embodiments of the present invention. The main difference between this embodiment and which is shown in FIG. 10 is that: The system further includes an elevating device 1700 to elevate the range finder 1100 with respect to the tool holder 1300. In other words, the elevating device 1700 lifts up the range finder 1100 to different level heights. Stated differently, the stator 1400 has an axial direction A, and the elevating device 1700 can move the range finder 1100 along the axial direction A of the stator 1400.

The elevating device 1700 and the range finder 1100 are disposed on the stator 1400. The range finder 1100 is a laser range finder that outputs a digital signal based on whether the laser beam emitted by the range finder 1100 is blocked when the range finder 1100 is located on a predetermined level height. The deficiency determination unit 1010 can determine the deficiency of the tool T based on the digital signal. For example, the range finder 1100 can output a high level voltage when the laser beam is blocked by the tool T. The range finder 1100 can output a low level voltage when the laser beam is not blocked by the tool T. Therefore, the deficiency determination unit 1010 can determine the deficiency of the tool T based on whether the laser beam is blocked by the tool T when the range finder 1100 is located on a predetermined level height.

In some embodiments, the range finder 1100 emits the laser beam to the tool T substantially along the radial direction R of the stator 1400, and the range finder 1100 is further movable along the axial direction A of the stator 1400. Therefore, the height of the tool T can be detected. When the detected height of the tool T is reduced compared to a predetermined height stored in the storage 1030, the tool T is determined as a deficient tool T. For example, if the laser beam is not blocked when the range finder 1100 is lifted to the predetermined level height on which the laser beam is expected as blocked, the tool T is determined as a deficient tool T. In some embodiments, the elevating device 1700 and the range finder 1100 that outputs the digital signal based on whether the laser beam is blocked when the range finder 1100 is elevated to the predetermined level height can be disposed on the rotor 1600 as shown in FIG. 11.

Figure 13:
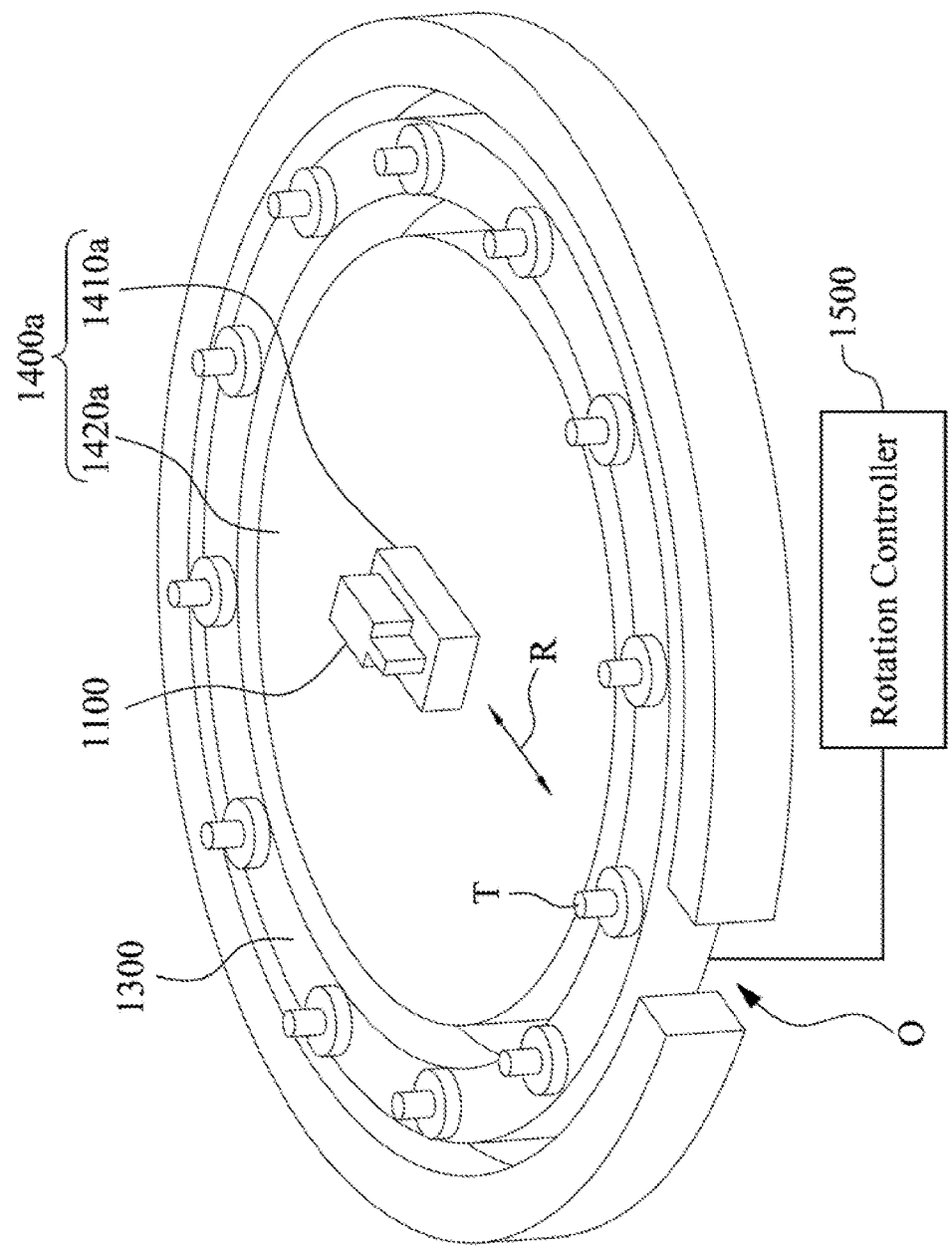

FIG. 13 is a perspective view of a system of detecting a deficiency of a tool T in accordance with some embodiments of the present invention. The main difference between this embodiment and which is shown in FIG. 10 is that: the system includes a stator 1400a surrounded by the tool holder 1300. In a greater detail, the tool holder 1300 is an annular structure that surrounds the stator 1400a. The stator 1400a may include a fixture 1410a and a disk 1420a. The fixture 1410a is fixed on the disk 1420a. The disk 1420a is surrounded by the tool holder 1300. The range finder 1100 is fixed on the fixture 1410a. As such, the range finder 1100 is stationary with respect to the stator 1400a and is surrounded by the tool holder 1300. The range finder 1100 can output an analog signal based on the distance between the range finder 1100 and the tool T when the tool holder 1300 rotates. In some embodiments, the elevating device 1700 and the range finder 1100 that outputs the digital signal based on whether the laser beam is blocked when the range finder 1100 is elevated to the predetermined level height can be disposed on the disk 1420a of the stator 1400a.

Figure 14:
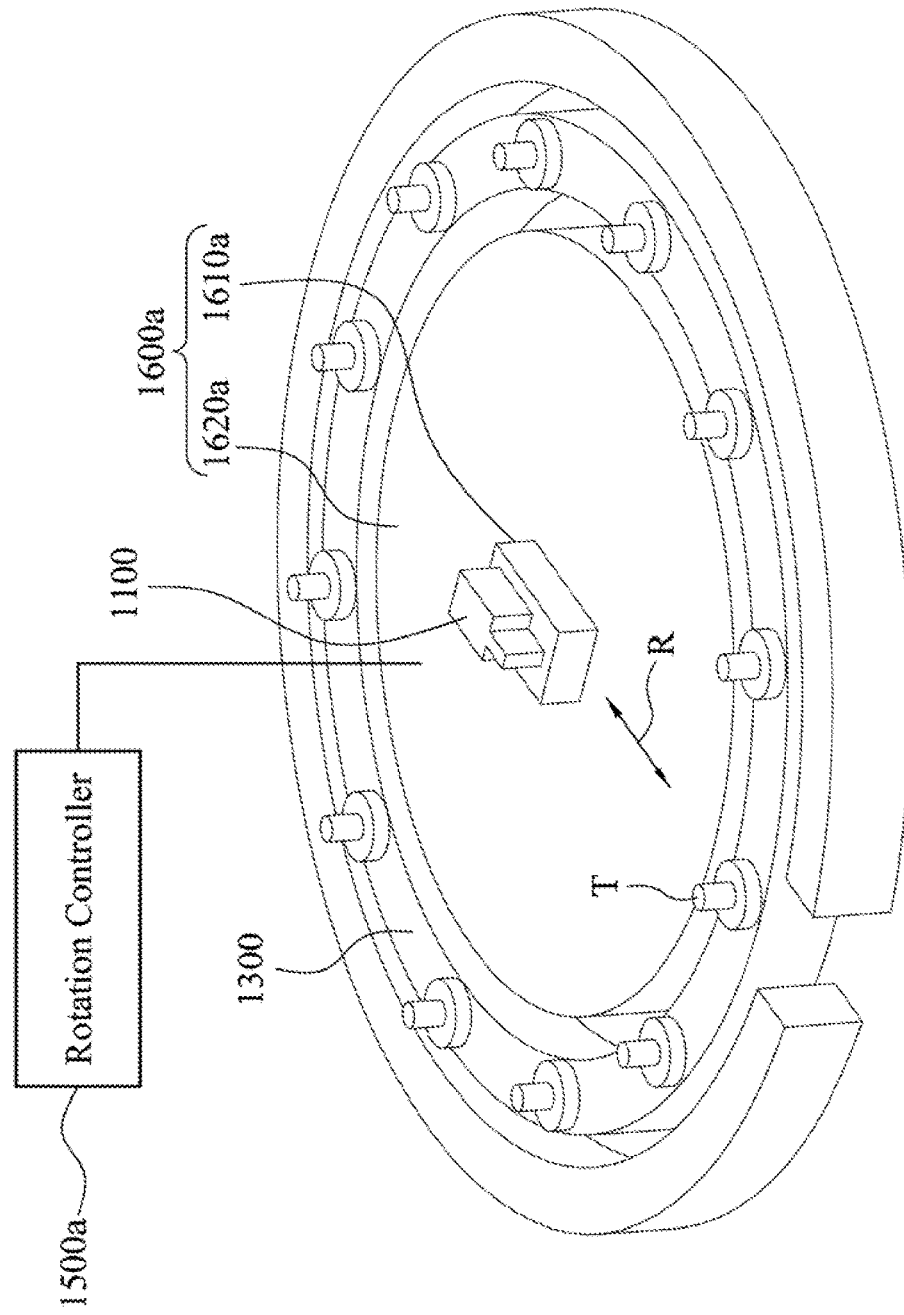

FIG. 14 is a perspective view of a system of detecting a deficiency of a tool T in accordance with some embodiments of the present invention. The main difference between this embodiment and which is shown in FIG. 14 is that: the system includes a rotor 1600a surrounded by the tool holder 1300. The range finder 1100 is stationary with respect to the rotor 1600a. The rotor 1600a is electrically connected to the rotation controller 1500a and can rotate under control the rotation controller 1500a, so that the rotor 1600a is rotatable with respect to the tool holder 1300. The fixture 1610a is fixed on the disk 1620a of the rotor 1600a, and the range finder 1100 is fixed on the fixture 1610a. The range finder 1100 can output an analog signal based on the distance between the range finder 1100 and the tool T when the tool holder 1300 rotates. In some embodiments, the elevating device 1700 and the range finder 1100 that outputs the digital signal based on whether the laser beam is blocked when the range finder 1100 is elevated to the predetermined level height can be disposed on the disk 1620a of the rotor 1600a.

Figure 15:
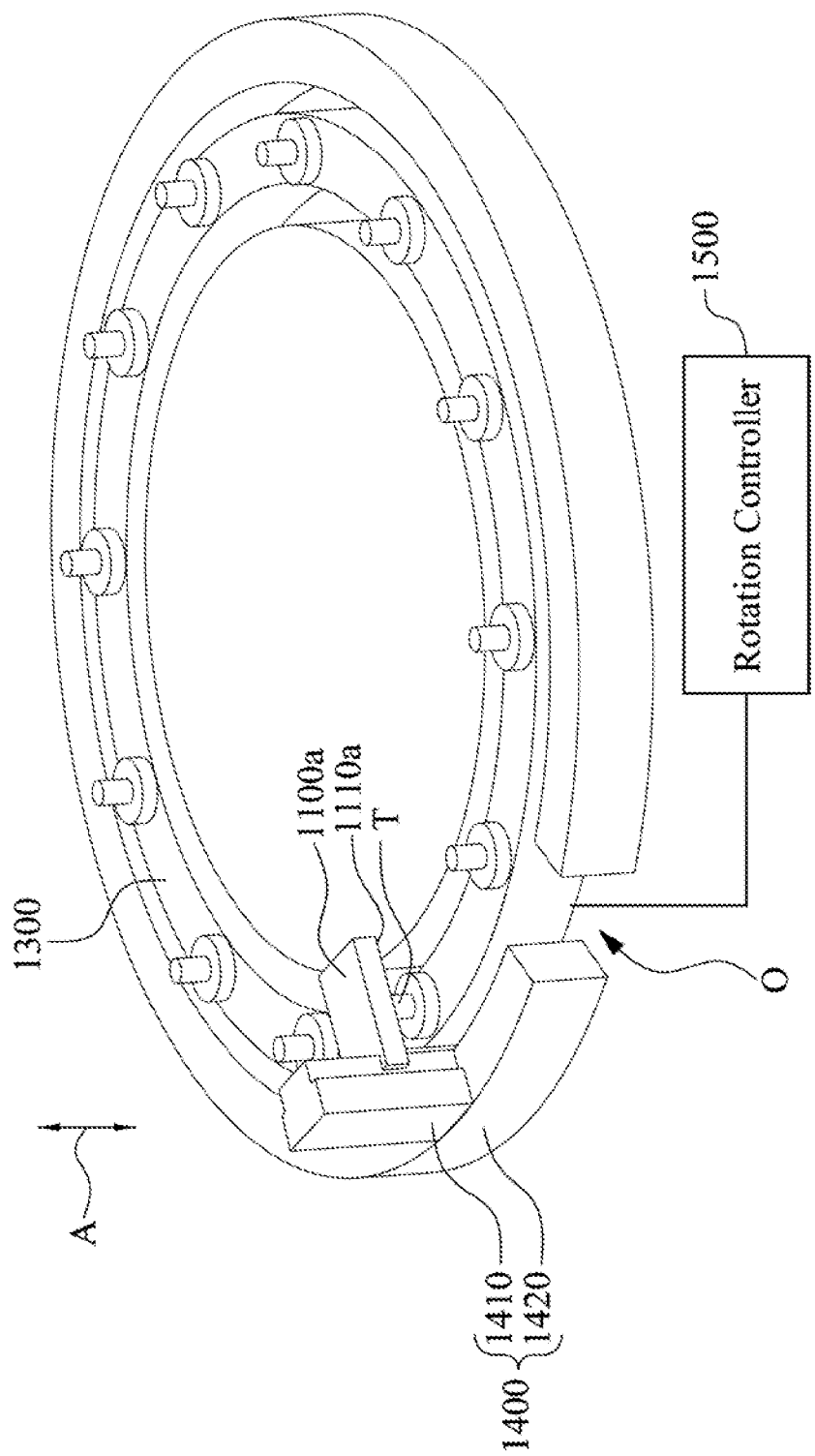

FIG. 15 is a perspective view of a system of detecting a deficiency of a main difference between this embodiment and which is shown in FIG. 10 is that: the laser source 1110a of the range finder 1100a emits a laser beam substantially along the axial direction A of the stator 1400. Therefore, the range finder 1100a may measure the distance between the range finder 1100a and the tool T along the axial direction A to determine the deficiency of the tool T. In some embodiments, a portion of the range finder 1100a is located above the tool holder 1300, so that the laser source 1110a can be located above the tool T. For example, the range finder 1100a outputs an analog signal based on the distance between the range finder 1100a and the tool T along the axial direction A. In some embodiments, the range finder 1100a is disposed on the annular rotor 1600 as shown in FIG. 11.

Figure 16:
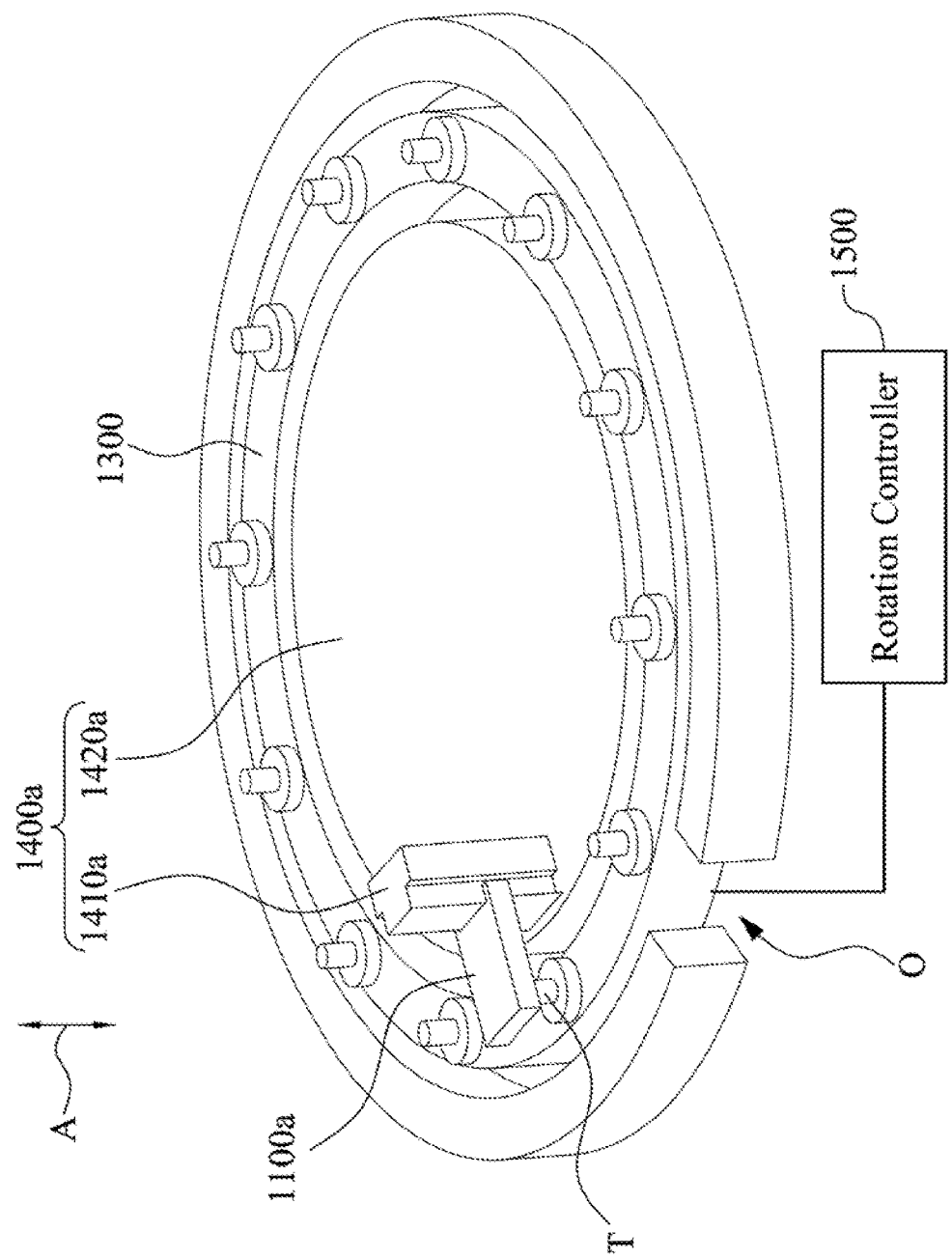

FIG. 16 is a perspective view of a system of detecting a deficiency of a tool T in accordance with some embodiments of the present invention. The main difference between this embodiment and which is shown in FIG. 15 is that: the system includes a stator 1400a surrounded by the tool holder 1300. In a greater detail, the tool holder 1300 is an annular structure that surrounds the stator 1400a. The stator 1400a may include a fixture 1410a and a disk 1420a. The fixture 1410a is fixed on the disk 1420a. The disk 1420a is surrounded by the tool holder 1300. The range finder 1100a is fixed on the fixture 1410a. As such, the range finder 1100a is stationary with respect to the stator 1400a and is surrounded by the tool holder 1300. A portion of the range finder 1100a is located above the outer tool holder 130, so as to measure the distance between the range finder 1100a and the tool T along the axial direction A to determine the deficiency of the tool T. In some embodiments, the range finder 1100*a* is disposed on the disk-shaped rotor 1600*a* as shown in FIG. 14.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A monitoring system for monitoring at least one machine, wherein each of the at least one machine has an operation lamp, the operation lamp is for emitting light at least when the machine is under operation, the monitoring system comprising:
    at least one light sensor configured to detecting the light emitted by the operation lamp;
    at least one fastener wrapping around the operation lamp, the fastener comprising a light-shielding body, wherein the light-shielding body has an accommodation groove and an inner surface, the inner surface is adjacent to the operation lamp, the accommodation groove is concavely formed at the inner surface, and the light sensor is accommodated in the accommodation groove; and
    at least one controller electrically connected with the light sensor for determining a status of the machine according to the light detected by the light sensor.

2. The monitoring system according to claim 1, further comprising:
    at least one flexible structure disposed between the fastener and the lamp.

3. The monitoring system according to claim 1, wherein the light sensor comprises:
    a photoresistor for changing resistance in view of the brightness of the operation lamp of the machine; and
    a variable resistor serially connected with the photoresistor.

4. The monitoring system according to claim 1, further comprising:
    at least one relay, wherein the number of the controller is plural, the controllers are electrically connected with the relay; and
    a server electrically connected with the relay.

5. The monitoring system according to claim 1, further comprising:
    at least one wireless access point, wherein the number of the controller is plural, the controllers are connected with the wireless access point wirelessly; and
    a server electrically connected with the wireless access point.

6. The monitoring system according to claim 1, further comprising:
    a range finder configured to generate a signal based on a distance between the range finder and a tool of the machine;
    a deficiency determination unit electrically connected to the range finder to determine a deficiency of the tool based on the signal; and
    a lamp controller electrically connected to the deficiency determination unit to change an optical property of the light emitted by the operation lamp based on the determined deficiency of the tool.

7. The monitoring system of claim 6, further comprising:
    a tool holder configured to hold the tool, wherein one of the tool holder and the range finder is movable with respect to another of the tool holder and the range finder.

8. The monitoring system of claim 7, further comprising:
    a stator surrounding the tool holder or surrounded by the tool holder, wherein the range finder is stationary with respect to the stator, and wherein the tool holder is rotatable with respect to the stator.

9. The monitoring system of claim 8, wherein the range finder emits a light beam substantially along a radial direction or an axial direction of the stator.

10. The monitoring system of claim 8, further comprising:
    a rotation controller electrically connected to the tool holder to rotate the tool holder such that a plurality of the tools of the machine are sequentially moved to a position on a traveling path of a light beam emitted from the range finder.

11. The monitoring system of claim 7, further comprising:
    a rotor surrounding the tool holder or surrounded by the tool holder, wherein the range finder is stationary with respect to the rotor, and wherein the rotor is rotatable with respect to the tool holder.

12. The monitoring system of claim 11, wherein the range finder emits a light beam substantially along a radial direction or an axial direction of the rotor.

13. The monitoring system of claim 11, further comprising:
    a rotation controller electrically connected to the rotor to rotate the rotor such that a traveling path of a light beam emitted from the range finder is moved to a plurality of the tools of the machine sequentially.

14. The monitoring system of claim 7, further comprising:
    an elevating device configured to elevate the range finder with respect to the tool holder.

15. The monitoring system of claim 6, wherein the range finder is configured to output a digital signal based on whether a light beam emitted by the range finder is blocked, and wherein the deficiency determination unit is configured to determine the deficiency of the tool based on the digital signal.

16. The monitoring system of claim 6, wherein the range finder is configured to output an analog signal based on the distance between the range finder and the tool when a light beam emitted by the range finder is blocked by the tool, and wherein the deficiency determination unit is configured to determine the deficiency of the tool based on the analog signal.

* * * * *